2,876,869
Patented Mar. 10, 1959

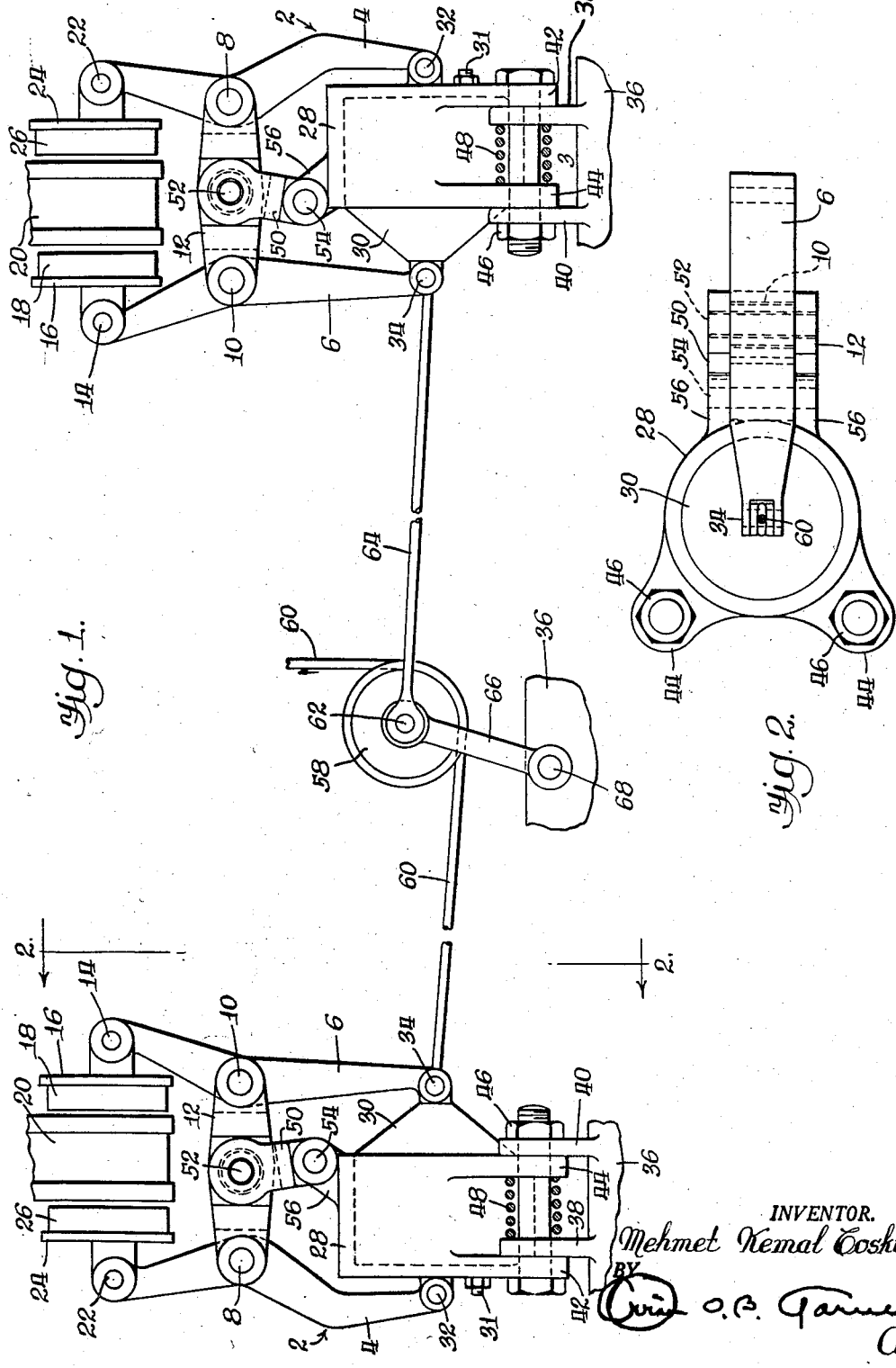

2,876,869

HAND BRAKE ARRANGEMENT

Mehmet Kemal Coskun, Granite City, Ill., assignor to American Steel Foundries, Chicago, Ill., a corporation of New Jersey Application February 24, 1953, Serial No. 338,483

7 Claims. (Cl. 188—204)

This invention relates to brakes and more particularly to a novel brake arrangement for decelerating one or more disks or rotors of a railway car truck.

A general object of the invention is to devise a brake arrangement having relatively few parts of economical construction and capable of long life in service.

A more specific object of the invention is to devise a brake arrangement such as above described, wherein the brake actuating power cylinder device may be directly connected to a supporting frame part such as a truck transom, thereby eliminating the necessity of a special cylinder housing or support as has become common practice in prior art arrangements.

A further object of the invention is to compensate for lateral movement of the wheel and axle assembly relative to the supported truck frame when the brakes are applied.

Another object of the invention is to devise a novel torque transmitting mechanism which permits movement of the brake levers during such relative lateral movement between the wheel and axle assembly and the truck frame while accommodating equalized pressure of the brake shoes against the disk.

Still another object of my invention is to devise a simple and economical hand brake, particularly adapted for actuation of a brake arrangement such as above described.

The foregoing and other objects and advantages of the invention will become apparent from a consideration of the following specification and the accompanying drawings, wherein:

Figure 1 is a top plan view of a brake arrangement embodying a preferred form of the invention, and Figure 2 is a fragmentary sectional view taken on the line 2—2 of Figure 1.

Describing the invention in detail, the novel brake arrangement preferably comprises a pair of brake units, generally designated 2, each of said units comprising levers 4 and 6 pivotally interconnected as at 8 and 10, respectively, to a floating link 12. The lever 6 is pivotally connected at 14 to a brake head 16 carrying a brake shoe 18 for engagement with one side of a brake disk or rotor 20 of a conventional railway wheel and axle assembly such as that shown in United States Letters Patent No. 2,581,746.

The brake lever 4 is pivotally connected as at 22 to a brake head 24 carrying a brake shoe 26 for engagement with the opposite side of the disk 20.

The levers are actuated by a power cylinder device comprising a cylinder 28 containing a piston 30, actuating fluid such as compressed air being admitted to the cylinder 28 through a nozzle 31 which may be connected to any convenient source of such fluid as, for example, a flexible line (not shown). The lever 4 is pivotally connected as at 32 to the closed end of the cylinder 28 and the lever 6 is pivotally connected as at 34 to the piston 30.

The power cylinder device 28, 30 is supported by a truck frame part fragmentarily indicated at 36, said part having spaced lugs 38 and 40, alternately arranged with lugs 42 and 44 of the cylinder 28 and connected thereto as, for example, by a bolt and nut assembly 46, one end of which is engaged with the lug 40, and the other end of which is engaged with the lug 42.

Preferably a spring 48 is positioned between the lugs 38 and 44 for a purpose hereinafter described, although it will be understood that this spring may be eliminated, and the lugs 38, 40, 42 and 44 may be rigidly interconnected, if desired.

As best seen in Figure 2, the cylinder 28 is preferably provided with lugs 42 and 44 above and below its horizontal center plane in order that torque forces on the cylinder 28 during a brake application, as hereinafter described, are transmitted to the frame part 36, which is connected to said lugs 42 and 44, as above described.

It will be understood that upon actuation of the power cylinder device 28, 30 the brake lever 6 associated therewith, is pivoted at 10 to engage the related shoe 18 with the disk 20, whereupon the lever 6 pivots at 14, transmitting a pulling force to the lever 4 by the floating link 12 to engage the shoe 26 with the other side of the disk 20. Upon engagement of the shoes 18 and 26 with the disk 20 torque forces are transmitted to the levers 4 and 6 and this torque force is preferably transmitted to the power cylinder device 28, 30 by a torque link or arm 50 pivoted at 52 and 54 to the link 12 and cylinder lugs 56, respectively. As previously noted, the torque forces are transmitted from the power cylinder device 28, 30 to the truck frame part 36.

It may be noted that movement of the disk 20 to the right or left, as seen in Figure 1, due to lateral movements of the wheel and axle assembly to which the disk is connected, is accommodated without disturbing the equalized pressure of the shoes 18 and 26 against the disk 20 by the pivotal connection of the levers 4 and 6 to the power cylinder device, and by the pivotal connection of the link 12 to the brake levers, and by the pivotal connection of the torque arm 50 to the link 12 and the power cylinder device.

Hand brake actuating means for the novel brake system are preferably provided in the form of a pulley or other rotatable member 58 floatingly supported between the brake units 2. A flexible tension member 60, such as a cable or chain is engaged with the perimeter of the pulley 58 and is connected at 34 to the brake lever 6, preferably at its point of pivotal connection to the piston 30. The pulley 58 is rotatably connected at 62 to a tension member, preferably in the form of a rod 64 connected to the lever 6 of the other brake unit 2, whereby the application of pulling force on the cable 60 in the direction of the arrow, as shown in Figure 1, actuates both brake units 2 to clamp their shoes 18 and 26 against the related brake disks 20. It will be noted that the pulley 58 is preferably afforded a floating support by a link or arm 66 rotatably connected thereto as at 62 and rotatably connected as at 68 to a support such as the above mentioned truck frame part 36. It will be noted that, if desired, the link 66 may be eliminated and the floating pulley 58 may be supported by the rod 64 or by any other suitable means, and it may be further noted that pulley 58 may be in the form of a sprocket, and the flexible member 60 may thus be in the form of a chain engageable with the teeth of the sprocket.

I claim:

1. A brake arrangement comprising pivoted brake levers, a rotatable member floatingly supported between said levers, a flexible tension member engaged with the perimeter of said rotatable member and connected to one of the brake levers, and another tension member rotatably connected at one end thereof to said rotatable member at its rotational axis, said other tension member being directly connected at its opposite end to the other brake lever, whereby a pulling force on said flexible member operates to actuate both levers.

2. In a brake arrangement for a pair of rotatable surfaces; the combination of brake rigging comprising a pair or pivoted levers, each having brake means for one of said surfaces, a pivot arm between said levers, a rotatable member rotatably mounted on said arm, a flexible tension member engaged with the perimeter of said rotatable member and connected to one of the levers, and a direct pull rod connection between the arm and the other lever, whereby a pulling force on said flexible member actuates both levers to engage their brake means under substantially equal pressure against the respective surfaces.

3. In a brake arrangement for a pair of rotatable surfaces; the combination of a support, brake levers pivotally supported thereby, and actuating means for said levers comprising a floating rotatable member therebetween, a flexible line connected to one lever and engaged with the perimeter of said rotatable member, and means rigidly connecting the other lever to said floating member at its rotational axis.

4. In a brake arrangement for a pair of pivoted brake levers; the combination of a rotatable member, tension means directly connecting said member at its rotational axis to one of said levers, and a flexible tension member engaged with the periphery of said rotatable member and connected to the other lever, whereby a pulling force on said flexible member actuates both levers.

5. In a brake arrangement for a railway car truck comprising a truck frame and a supporting wheel and axle assembly having a pair of brake disks; the combination of brake units associated with respective disks, each of said units comprising a lever pivoted intermediate its ends to a support supported by the frame, a tension member directly connected to one of the levers, a member rotatably connected directly to the tension member, and a flexible tension line engaged with the perimeter of the rotatable member and connected to the other brake lever.

6. In a brake arrangement for a railway car truck comprising a truck frame and a supporting wheel and axle assembly having a pair of brake disks; the combination of a pair of brake units associated with respective disks, and brake actuating means for said units comprising a tension member directly connected to one of the units for actuation thereof, a member rotatably connected directly to the tension member, and a flexible tension member engaged with the perimeter of the rotatable member and connected to the other brake unit for actuation thereof.

7. In a brake actuating linkage arrangement for a pair of independent brake mechanisms associated with separate friction surfaces, the combination of: a rotatable member, tension means directly connecting said member at its rotational axis to one of said mechanisms, and a flexible tension member engaged with the periphery of said rotatable member and connected to the other of said mechanisms, so that a pulling force on said flexible member actuates both mechanisms.

References Cited in the file of this patent

UNITED STATES PATENTS

| | | |
|---|---|---|
| 1,612,781 | Sauvage | Dec. 28, 1926 |
| 1,935,334 | Schiller | Nov. 14, 1933 |
| 1,947,880 | Sanford | Feb. 20, 1934 |
| 2,174,401 | Farmer | Sept. 26, 1939 |
| 2,286,517 | Tack | June 16, 1942 |
| 2,394,151 | Coombes | Feb. 5, 1946 |
| 2,436,136 | Baselt | Feb. 17, 1948 |
| 2,447,244 | Gaenssle | Aug. 17, 1948 |
| 2,460,693 | Hall | Feb. 1, 1949 |
| 2,461,194 | Beette | Feb. 8, 1949 |

FOREIGN PATENTS

| | | |
|---|---|---|
| 678,499 | Great Britain | Sept. 3, 1952 |